United States Patent
Giannella et al.

(10) Patent No.: US 12,320,410 B2
(45) Date of Patent: Jun. 3, 2025

(54) ACTUATOR MECHANISM

(71) Applicant: Rivian IP Holdings, LLC, Irvine, CA (US)

(72) Inventors: Robert Giannella, Irvine, CA (US); Thomas Young, Costa Mesa, CA (US); Kostandinos Papanikolaou, Corona, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 266 days.

(21) Appl. No.: 17/825,313

(22) Filed: May 26, 2022

(65) Prior Publication Data
US 2023/0383823 A1 Nov. 30, 2023

(51) Int. Cl.
  *F16H 25/18* (2006.01)
  *F16H 25/20* (2006.01)
  *H02K 7/06* (2006.01)
  *H02K 7/116* (2006.01)

(52) U.S. Cl.
  CPC .......... *F16H 25/186* (2013.01); *F16H 25/20* (2013.01); *H02K 7/06* (2013.01); *H02K 7/116* (2013.01); *F16H 2025/204* (2013.01); *F16H 2025/2084* (2013.01)

(58) Field of Classification Search
  CPC .......... F16H 25/186; F16H 25/20; F16H 7/06; F16H 7/116; F16H 2025/204; F16H 2025/2084
  See application file for complete search history.

(56) References Cited

U.S. PATENT DOCUMENTS

| | | | | |
|---|---|---|---|---|
| 2,944,431 A | * | 7/1960 | Dexter | F16H 25/186 15/154.2 |
| 6,629,575 B2 | * | 10/2003 | Nikolov | B60N 2/4279 297/216.16 |
| 2002/0147535 A1 | * | 10/2002 | Nikolov | B60N 2/4214 340/425.5 |
| 2003/0106391 A1 | * | 6/2003 | McMillen | F16C 1/16 74/501.5 R |
| 2015/0308525 A1 | * | 10/2015 | Kim | F16D 65/0068 188/71.8 |
| 2019/0277355 A1 | * | 9/2019 | Kim | F16D 65/18 |
| 2022/0025947 A1 | * | 1/2022 | Baek | F16D 65/18 |
| 2022/0041151 A1 | * | 2/2022 | Kim | F16D 65/18 |
| 2023/0123351 A1 | * | 4/2023 | Baek | F16D 65/567 188/72.1 |

FOREIGN PATENT DOCUMENTS

| | | | | |
|---|---|---|---|---|
| DE | 102014002133 A1 | * | 8/2014 | ......... F16D 65/0068 |
| DE | 102016221904 A1 | * | 11/2017 | ............. B60T 13/74 |

* cited by examiner

*Primary Examiner* — Zakaria Elahmadi
(74) *Attorney, Agent, or Firm* — Foley & Lardner LLP

(57) ABSTRACT

The actuator can include a driver coupled with a motor. The actuator can include a shaft extending through the driver. The actuator can include an anchor coupled with the shaft. The motor can be configured to translate the anchor at a first time by translation of the shaft through the driver. The motor can be configured to rotate the anchor at a second time by rotation of the shaft with the driver. The second time can be different than the first time.

18 Claims, 7 Drawing Sheets

ACTUATOR MECHANISM

INTRODUCTION

Vehicles or other machines can include motors that can provide power to move objects. Objects can be moved to different positions.

SUMMARY

Movement of an object can include both translational and rotational movement. Providing translational and rotational movement can require multiple power supplies or larger actuating mechanisms. The technical solution described herein provides an actuator that can translate and rotate an object by using a single motor. The translation and rotation can occur at different times. The use of a single motor and providing translation and rotation at separate times can reduce the size of the actuator and reduce the stress on the components of the actuator.

At least one aspect is directed to an apparatus. The apparatus can include a driver coupled with a motor. The apparatus can include a shaft extending through the driver. The apparatus can include an anchor coupled with the shaft. The motor can be configured to translate the anchor at a first time by translation of the shaft through the driver. The motor can be configured to rotate the anchor at a second time by rotation of the shaft with the driver. The second time can be different than the first time.

At least one aspect is directed to a method. The method can include moving an anchor of an actuator in a first direction. The actuator can include a driver coupled with a motor. The actuator can include a shaft extending through the driver. The actuator can include the anchor coupled with the shaft. The method can include moving the anchor in a second direction. Moving the anchor in the second direction can occur at a different time than moving the anchor in the first direction.

At least one aspect is directed to an electric vehicle. The electric vehicle can include an actuator. The actuator can be coupled with a vehicle component. The actuator can include a motor. The actuator can include a driver coupled with the motor. The actuator can include a shaft extending through the driver. The actuator can include an anchor coupled with the shaft. The motor can be configured to translate the anchor and rotate the anchor. The translation and the rotation can occur at different times. The actuator can be configured to move the vehicle component from a first position to a second position.

At least one aspect is directed to a method. The method can include providing an actuator. The actuator can include a driver coupled with a motor. The actuator can include a shaft extending through the driver. The actuator can include an anchor coupled with the shaft. The motor can be configured to translate the anchor at a first time by translation of the shaft through the driver. The motor can be configured to rotate the anchor at a second time by rotation of the shaft with the driver. The second time can be subsequent to the first time.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
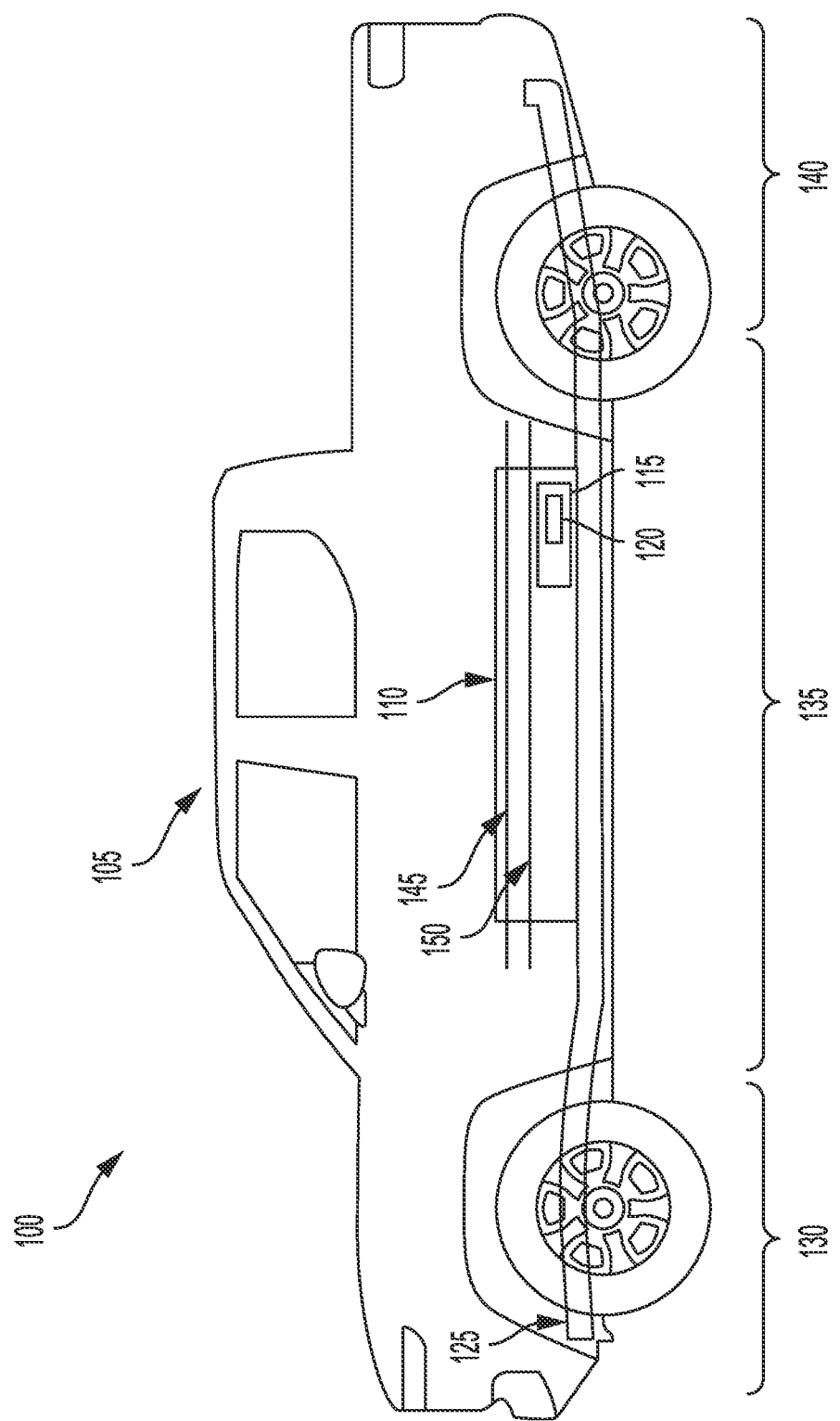
FIG. 1 depicts an example electric vehicle, in accordance with some aspects.

Following below are more detailed descriptions of various concepts related to, and implementations of, methods, apparatuses, and systems of translating and rotating an anchor at separate times with a single motor. The various concepts introduced above and discussed in greater detail below may be implemented in any of numerous ways.

The present disclosure is generally directed to systems and methods for using a motor to drive both translational movement and rotational movement such that only one movement is performed at a time (e.g., no translation when rotating and no rotation when translating). The disclosed solutions can have a technical advantage of providing the translational and rotational movements at separate times which can reduce the amount of stress felt by the system, reduce the wear and tear on the components of the system, and reduce the overall size of the system.

The disclosed solution can include an actuator. The actuator can include for example a single motor configured to rotate and translate an anchor or other actuator component such as a shaft, wherein the rotation and the translation do not occur simultaneously. The translational movement can be achieved by a shaft extending through a driver and being coupled with the anchor. The anchor can be disposed within a cavity defined by a housing body. The housing body can have a slot. The slot can have a translational portion and a rotational portion. The anchor can have a pin that can be disposed within, and move along, the slot of the housing body. The motor of the actuator can cause the driver to rotate. When the pin of the anchor is disposed in the translational portion of the slot, the anchor can prevent the shaft from rotating with the driver, which can cause the shaft to instead translate through the driver and along the housing body. The translation of the shaft can cause a translation of the anchor.

The rotational movement can be achieved by engaging components of a torque transmission element. The torque transmission element can include the driver and an engagement element. The engagement element can be disposed within the cavity of the housing body and can be disposed between the anchor and the driver. When the engagement element engages with the driver, the rotation of the driver caused by the motor can cause the engagement element to rotate. The engagement element can be coupled with the anchor such that rotation of the engagement element can cause rotation of the anchor. The engagement element can rotate once the pin of the anchor reaches an end of the translational portion of the slot. Once the pin is at the end of the translational portion and adjacent to the rotational portion of the slot, the rotation of the driver can cause the engagement element to rotate and the pin of the anchor to move along the rotational portion of the slot.

The configuration of the slot can facilitate the separation between the translational and rotational movements. For example, the pin can be at an end of the translational portion of the slot and be done translating before the anchor begins to rotate. Similarly, when moving in the opposite direction, the pin can be at an end of the rotational portion of the slot and be done rotating before the anchor begins to translate.

The disclosed solutions have a technical advantage of reducing a size of a mechanism used for rotating and translating an anchor. The technical solutions described herein can use a single motor to actuate both the rotational and translational movement. The use of a single motor can reduce an overall size of the actuating mechanism. The technical solutions described herein can also perform the rotation and translation at separate times. Separating the movements can lead to shorter barrel cams, which can also reduce the size of the overall actuating mechanism as well as reduce the number of parts of the actuating mechanism. Reducing the size and number of parts can reduce the cost and packaging size of the actuating mechanism.

The disclosed solutions also have a technical advantage of reducing the amount of wear and tear on the components of the actuating mechanism used to translate and rotate the anchor. The technical solutions described herein can reduce friction loads on the components of the system. The total number and magnitude of forces applied to the components of the system can be reduced by having the two distinct movements that occur at different times.

FIG. 1 depicts an example cross-sectional view 100 of a vehicle 105 such as an electric vehicle installed with at least one battery pack 110. Electric (or internal combustion engine) vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, hydrogen vehicles, internal combustion engine vehicles, or other vehicles such as sea or air transport vehicles, planes, helicopters, submarines, boats, or drones, among other possibilities. The battery pack 110 may also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 2:
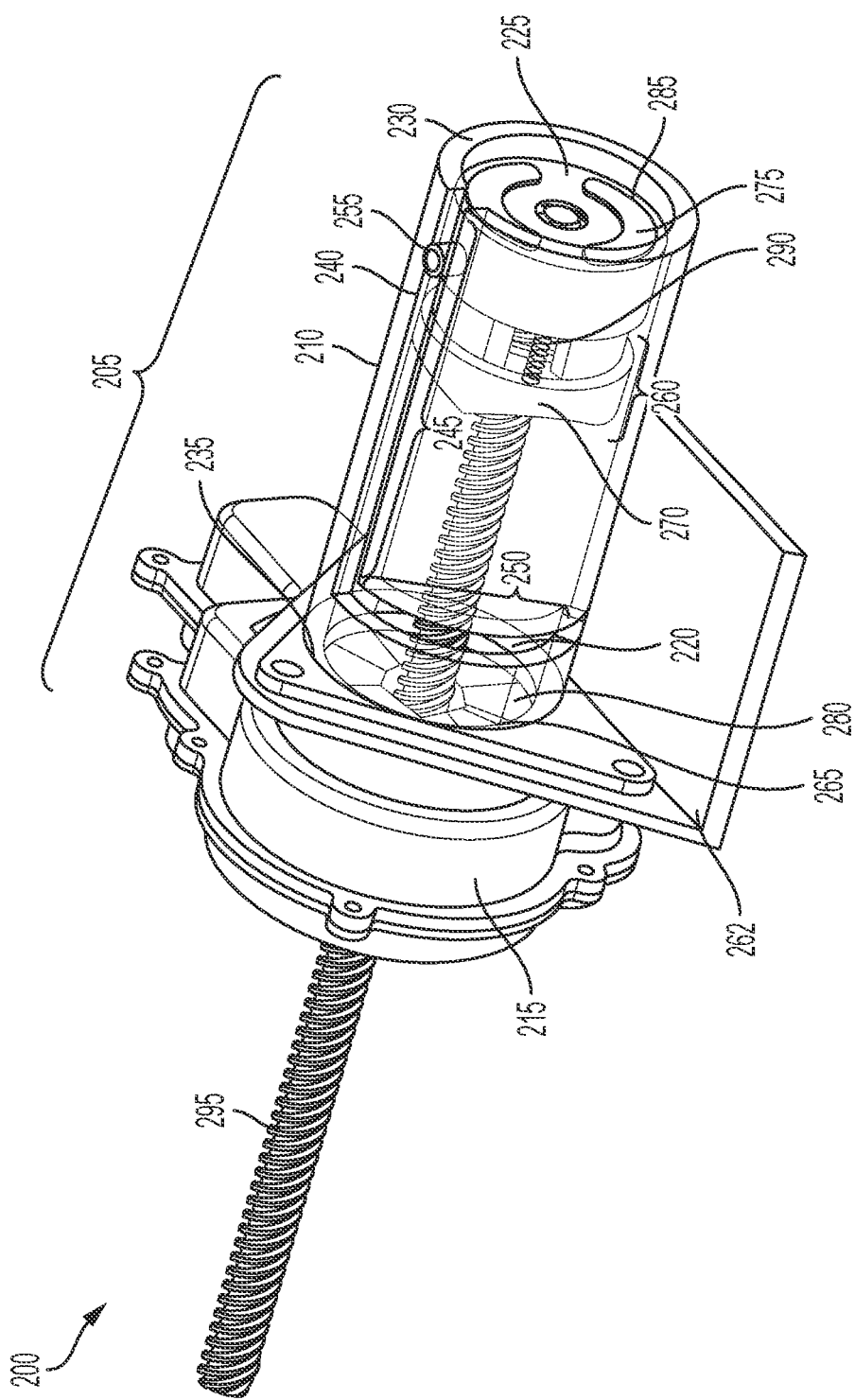
FIG. 2 depicts a front perspective view of an example actuator, in accordance with some aspects.

FIG. 2 depicts a front perspective view of an example actuator 200. The actuator 200 can include at least one housing 205. The housing 205 can include at least one housing body 210 and at least one housing base 215. The housing body 210 can extend from the housing base 215. The housing body 210 can have any length. For example, the housing body 210 can have a length less than 80 mm. The housing body 210 can also have a length equal to or greater than 80 mm. The housing body 210 can define at least one cavity 220. The cavity 220 can receive at least one anchor 225. For example, the anchor 225 can be disposed in the cavity 220. The anchor 225 can translate along at least a portion of the housing body 210. The anchor 225 rotate within at least a portion of the housing body 210. The anchor 225 can have any shape. For example, the anchor can have a cylindrical shape. The cavity 220 of the housing body 210 can have any shape. The shape of the cavity 220 can correspond with the shape of the anchor 225. For example, a first portion of the housing body 210 can be or include a shape capable of receiving the anchor 225 and allowing the anchor 225 to translate. A second portion of the housing body 210 can be or include a shape capable of receiving the anchor 225 and allowing the anchor 225 to rotate. The first portion and the second portion can be or include the same shape. For example, the housing body 210 can define a cylindrical cavity 220 configured to receive the anchor 225. The anchor 225 can have a corresponding cylindrical shape.

The anchor 225 can rotate and translate within the cavity 220. The rotation and translation can occur at different times. For example, the rotation can occur prior to the translation or the rotation can occur after the translation. The housing body 210 can have a first end 230 and a second end 235. The first end 230 can be disposed away from the housing base 215. The second end 235 can be disposed adjacent to the housing base 215. The anchor 225 can translate within the cavity 220 between the first end 230 and the second end 235. The anchor 225 can rotate when disposed at, or proximate to, at least one of the first end 230 and the second end 235 (e.g., has traveled over 90% of the length of the cavity 220). The anchor 225 can rotate at other locations along the housing body 210. For example, the anchor 225 can rotate when at the center of the housing body 210.

The housing body 210 can have at least one slot 240. The slot 240 can extend from the cavity 220 to an outer surface of the housing body 210. The slot 240 can also extend from the cavity 220 and only partially into the housing body 210. For example, the slot 240 can extend halfway through a wall of the housing body 210 such that the slot 240 is not visible from outside of the housing body 210. The slot 240 can have at least two portions. For example, the slot 240 can have a first portion, shown as translational portion 245, and a second portion, shown as rotational portion 250. The translational portion 245 can extend longitudinally along the housing body 210. For example, the translational portion 245 can extend between the first end 230 and the second end 235 of the housing body 210. The translational portion 245 can extend through the first end 230 of the housing body 210. Extending through the first end 230 of the housing body 210 can facilitate easy receipt and removal of the anchor from the cavity 220. The rotational portion 250 can extend circumferentially around the housing body 210. For example, the housing body 210 can have a round shape. The rotational portion 250 can extend along the circumference of the housing body 210. The rotational portion 250 can extend along an entire circumference of the housing body 210 or a portion of the housing body 210. For example, the rotational portion 250 can extend around 25% (+/−10%) of the circumference of the housing body 210. Extending around 25% of the circumference of the housing body 210 can facilitate, for example, a 90 degree (+/−10%) rotation of the anchor 225.

The anchor 225 can have at least one pin 255. The pin 255 can extend away from the anchor and at least partially into the slot 240. The pin 255 can move through the slot 240. For example, the anchor 225 can be disposed within the cavity 220 of the housing body 210. The anchor 225 can be positioned such that the pin 255 is disposed, at least partially, within the slot 240. When the pin 255 is in the slot 240, the pin 255 can move along the slot 240. For example, the anchor 225 can translate within the cavity 220. As the anchor 225 translates, the pin 255 can translate through the translational portion 245 of the slot 240. The anchor 225 can rotate within the cavity 220. As the anchor rotates, the pin 255 can move through the rotational portion 250 of the slot 240.

The slot 240 can facilitate the translation and the rotation of the anchor 225. For example, the slot 240 can define the possible movements of the anchor 225. For example, the range of movements of the anchor 225 can be confined by the configuration of the slot 240. The slot 240 can limit the amount of movement of the anchor 225. For example, the anchor 225 can translate along the housing body 210 for a distance that is as long as the translational portion 245 of the slot 240. When the pin 255 reaches an end of the translational portion 245, the translational movement can stop. The anchor 225 can rotate around a central axis such that the pin 255 travels a distance that is as long as the rotational portion 250 of the slot 240. When the pin 255 reaches an end of the rotational portion 250, the rotational movement can stop.

The slot 240 can limit the type of movement of the anchor 225. For example, when the pin 255 is disposed in the translational portion 245 of the slot 240, the anchor 225 can translate along the housing body 210 in a forward direction or a backward direction, but the slot 240 can prevent the anchor 225 from rotating. When the pin 255 is disposed in the rotational portion 250 of the slot 240, the anchor 225 can rotate within the housing body 210 in a clockwise or counter-clockwise direction, but the slot 240 can prevent the anchor 225 from translating. The slot 240 can prevent the anchor 225 from performing rotational and translational movements simultaneously. For example, the rotation can be before or after the translation, but not during the translation.

The actuator 200 can include a torque transmission element. The torque transmission element can include at least one engagement element 260 and at least one driver 265. The engagement element 260 can be disposed in the cavity 220 of the housing body 210. The driver 265 can be disposed, at least partially, in the housing base 215. The driver 265 can create a boundary between the housing body 210 and the housing base 215. The engagement element 260 can engage with the driver 265. The engagement element 260 can have at least one head 270 and at least one projection 275. The head 270 of the engagement element 260 can be configured to interface with the driver 265. For example, the driver 265 can have at least one recess 280. The recess 280 can be configured to receive at least a portion of the head 270. For example, the head 270 can have a shape that corresponds with a shape of the recess 280 of the driver 265. The anchor 225 can define an anchor cavity 285. The projection 275 can be configured to extend at least partially through the anchor cavity 285 of the anchor 225. The engagement element 260 can be coupled with the anchor 225. For example, the engagement element 260 can be rotatably coupled with the anchor 225 such that if either the engagement element 260 or the anchor 225 rotates, the other rotates. The engagement element 260 can be, at least partially, translationally coupled with the anchor 225. For example, a spring 290 can be disposed between the anchor 225 and the engagement element 260. The spring 290 can be configured to move the anchor 225 and the engagement element 260 together. For example, when the anchor 225 translates along the housing body 210, the spring 290 can cause the engagement element 260 to move with the anchor 225. However, when a force is applied to the engagement element 260, the spring 290 can compress and cause the anchor 225 to translate with respect to the engagement element 260. For example, when the engagement element 260 interfaces with the driver 265, the anchor 225 can continue to translate toward the engagement element 260 and compress the spring 290. The compression of the spring 290 can increase a frictional force between the driver 265 and the engagement element 260 and result in the driver 265 rotating the engagement element 260 and the anchor 225.

The actuator 200 can include at least one shaft 295. The shaft 295 can extend through the driver 265. For example, a first portion of the shaft 295 can be disposed in the housing body 210 and a second portion of the shaft 295 can be disposed in the housing base 215. The shaft 295 can move the anchor 225. For example, the shaft 295 can be coupled with the anchor 225. As the shaft 295 translates, the anchor 225 can translate. As the shaft 295 rotates, the anchor 225 can rotate. The translation and rotation of the shaft 295 can be dictated, at least partially, by a position of the pin 255 within the slot 240.

The housing body 210 can be coupled with the housing base 215 or integrally formed with the housing base 215. The housing body 210 can also be separated from the housing base 215. For example, at least one mounting mechanism 262 can be disposed, at least partially, between the housing body 210 and the housing base 215. The mounting mechanism 262 can facilitate securing the actuator 200 in a desired position. For example, the mounting mechanism 262 can be or can include a flange with a first plate and a second plate. The first plate can be disposed between the housing body 210 and the housing base 215 and configured to couple the mounting mechanism 262 with the housing 205. The second plate can have any orientation configured to couple with an external component to secure the actuator 200 with the external component. For example, the second plate can be coupled with a compartment wall to keep the actuator 200 in place and oriented appropriately. The mounting mechanism 262 can be coupled with the housing 205 or can be integrally formed with at least one of the housing body 210 and the housing base 215.

Figure 3:
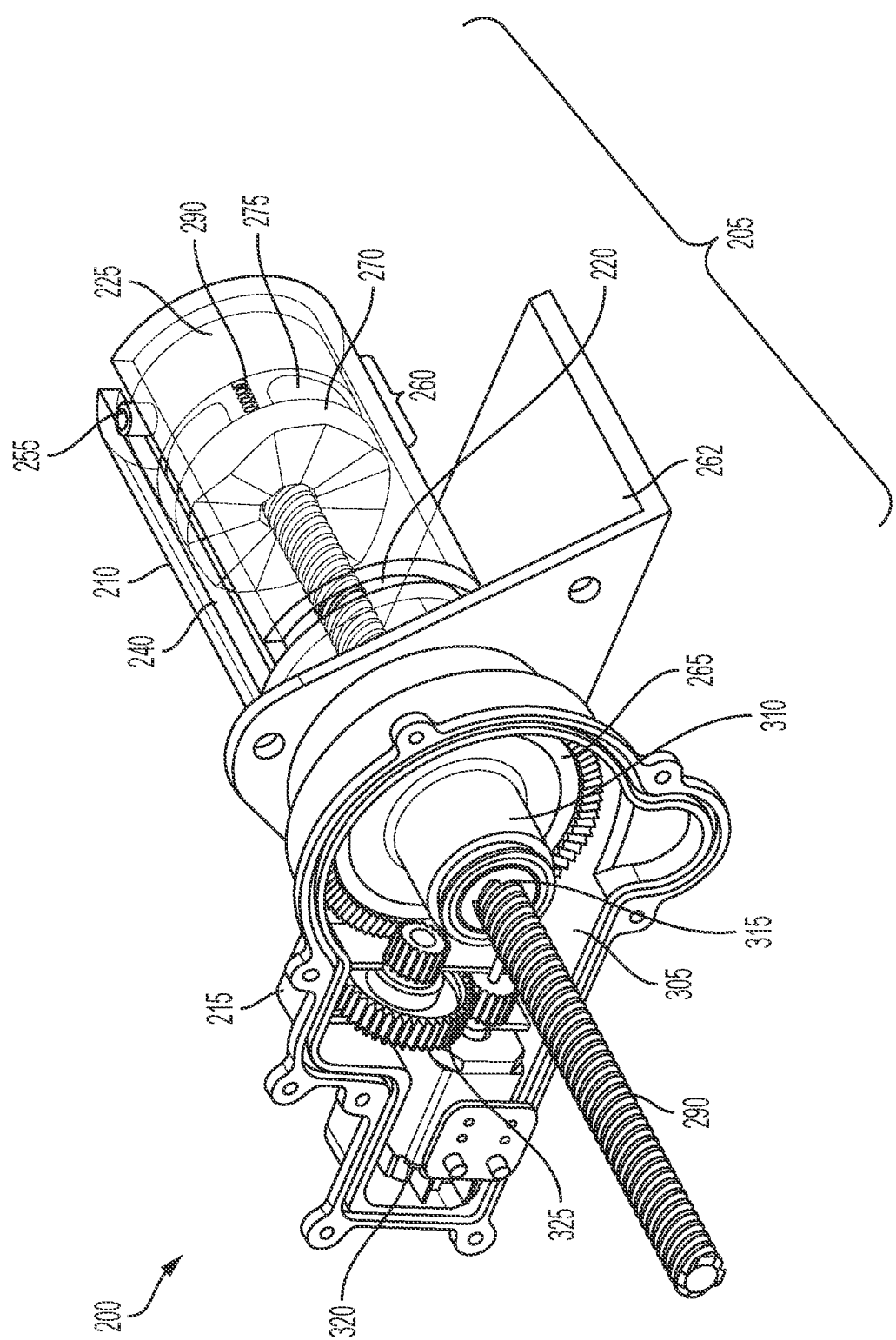
FIG. 3 depicts a rear perspective view of an example actuator, in accordance with some aspects.

FIG. 3 depicts a rear perspective view of the example actuator 200. The housing base 215 can define a base cavity 305. The base cavity 305 can be open to the cavity 220 of the housing body 210. At least a portion of the driver 265 can be disposed in the base cavity 305. For example, the housing base 215 can retain at least a portion of the driver 265. The driver 265 can be a barrier separating the cavity 220 of the housing body 210 and the base cavity 305 of the housing base 215. The driver 265 can have a central structure 310. An inner surface of the central structure 310 can define a driver aperture 315 that extends from a first end of the driver 265 to a second end of the driver 265. For example, the driver aperture 315 can define a passage for the shaft 295 to extend through the driver 265. The shaft 295 can extend through the driver aperture 315 from the housing base 215 and into the housing body 210. An inner surface of the central structure 310 can be configured to interact with an outer surface of the shaft 295. For example, the inner surface of the central structure 310 can have internal threads and the outer surface of the shaft 295 can have outer threads. The inner threads can engage with the outer threads such that motion of the driver 265 can cause motion of the shaft 295. Similarly, motion of the shaft 295 can cause motion of the driver 265.

The driver 265 can drive the shaft 295. For example, rotation of the driver 265 in a first direction can cause the shaft 295 to either translate in a first direction or rotate in a first direction depending, at least partially, on where the pin 255 of the anchor 225 is in the slot 240. Rotation of the driver in a second direction can cause the shaft 295 to either translate in a second direction or rotate in a second direction depending, at least partially, on where the pin 255 of the anchor 225 is in the slot 240. For example, the shaft 295 can be coupled with the anchor 225. The pin 255 of the anchor 225 can be disposed in the translational portion 245 of the slot 240. Rotation of the driver 265 when the pin 255 is in the translational portion 245 can cause the shaft 295 to translate along the housing body 210. For example, the pin 255 in the translational portion 245 can prevent the anchor 225 from rotating, which can prevent the shaft 295 from rotating. For example, a wall of the slot 240 may counteract or prevent any rotational forces felt by the shaft 295. With the shaft 295 interacting with the driver 265, instead of rotating with the driver 265, the shaft 295 can translate through the central structure 310 of the driver 265 and translate the anchor 225 with it. Rotation of the driver 265 in a first direction can cause translation of the shaft 295 (and the anchor 225) in a first translational direction. Rotation of the driver 265 in a second direction can cause translation of the shaft 295 (and the anchor 225) in a second translational direction.

The pin 255 can be disposed in the rotational portion 250 of the slot 240. Rotation of the driver 265 when the pin 255 is in the rotational portion 250 can cause the shaft 295 to rotate within the housing body 210. With no counteracting force from a side of the slot 240, the shaft 295 can rotate with the driver 265. Rotation of the driver 265 in a first direction can cause rotation of the shaft 295 (and the anchor 225) in a first rotational direction. Rotation of the driver 265 in a second direction can cause rotation of the shaft 295 (and the anchor 225) in a second rotational direction.

To actuate the driver, the actuator 200 can include at least one motor 320. The motor 320 can be disposed, at least partially, within the housing base 215. For example, the housing base 215 can retain at least a portion of the motor 320. The motor 320 can interact directly or indirectly with the driver 265. For example, the motor 320 can be coupled (directly or indirectly) with the driver 265. The motor 320 can be directly coupled with the driver 265 such that one rotation of the motor 320 can create one rotation of the driver 265. The motor 320 can be indirectly coupled with the driver 265 via a gear cluster 325. The gear cluster 325 can include any number of gears to generate the desired rotational speed of the driver 265. The gear cluster 325 can be disposed, at least partially, within the housing base 215.

Figure 4:
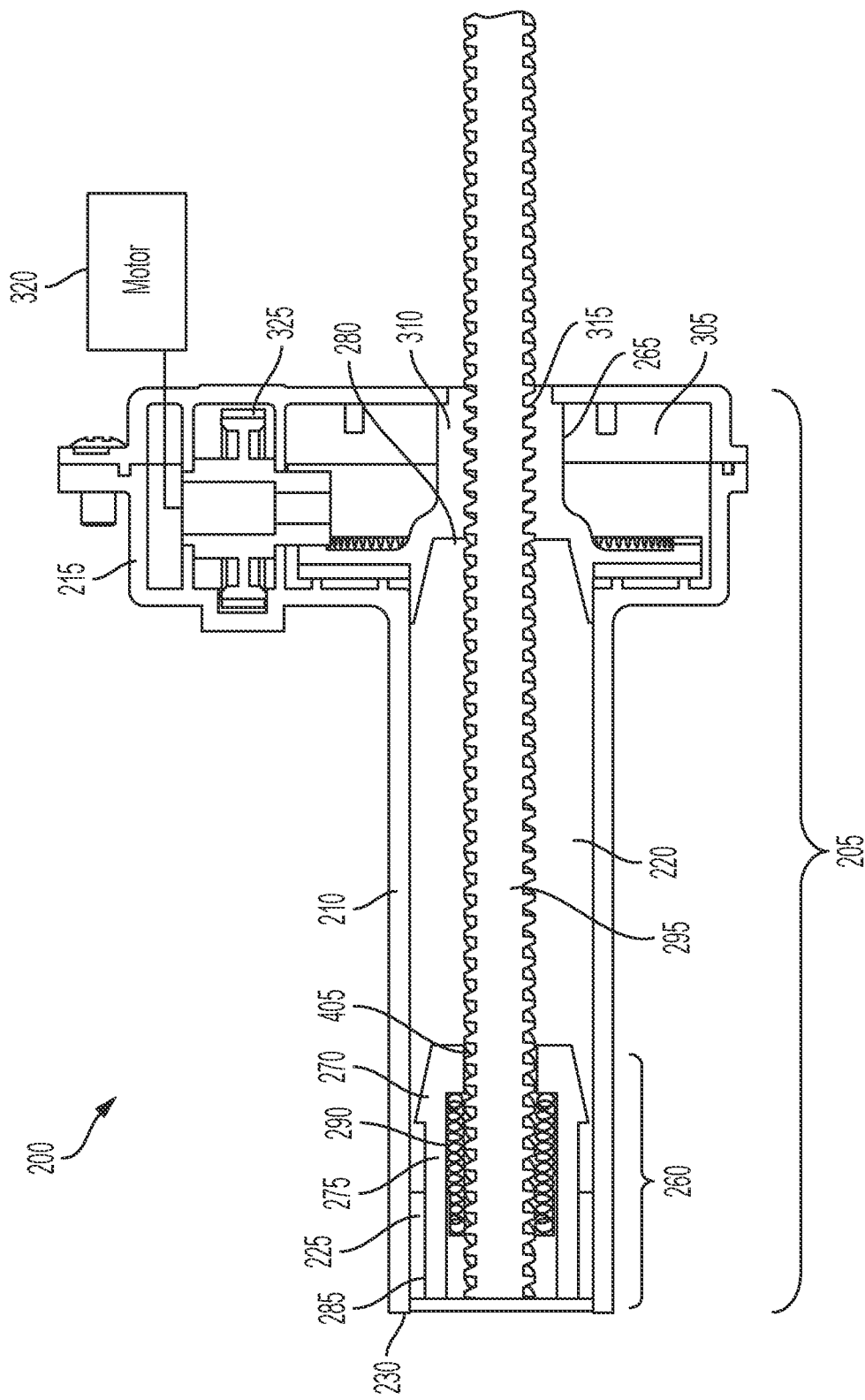
FIG. 4 depicts a side cross-sectional view of an example actuator, in accordance with some aspects.

FIG. 4 depicts a cross-sectional side view of the example actuator 200. The housing body 210 of the actuator 200 can define the cavity 220. The housing body 210 can retain the anchor 225 and the engagement element 260. The anchor 225 can be disposed at a first end 230 of a housing body 210. The pin 255 of the anchor 225 can be disposed in the translational portion 245 of the slot 240 of the housing body 210. This position of the anchor 225 can be a first position of the anchor 225. The engagement element 260 can be disposed in the cavity 220. The engagement element 260 can be disposed, at least partially, between the anchor 225 and the driver 265. The driver 265 can be disposed at least partially in the housing base 215. The housing base 215 can be disposed at the second end 235 of the housing body 210. The engagement element 260 can have a head 270 and at least one projection 275. The head 270 can be disposed between the anchor 225 and the driver 265. The projection 275 can extend from the head 270 toward the anchor 225. The projection 275 can correspond with an anchor cavity 285. A portion of the projection 275 can extend into the anchor cavity 285. The projection 275 can couple the engagement element 260 with the anchor 225. For example, the projection 275 can rotatably couple the engagement element 260 with the anchor 225. For example, rotation of the anchor 225 can cause rotation of the engagement element 260.

A spring 290 can be disposed between the engagement element 260 and the anchor 225. The spring 290 can couple the engagement element 260 with the anchor 225. For example, the spring 290 can, at least partially, translationally couple the engagement element 260 with the anchor 225. For example, translation of the anchor 225 can cause translation of the engagement element 260. The spring 290 can also allow translational movement between the engagement element 260 and the anchor 225 when a force is applied to the engagement element 260. For example, a force may be applied to the engagement element 260 such that the engagement element 260 cannot translate any further. The anchor 225 can continue to translate such that the spring 290 between the engagement element 260 and the anchor 225 compresses. When the spring 290 compresses, the anchor 225 can move closer to the head 270 of the engagement element 260. When the spring 290 compresses, the projection 275 of the engagement element 260 can extend further into the corresponding anchor cavity 285 or through the anchor cavity 285.

A shaft 295 can be coupled with the anchor 225. For example, the shaft 295 can be fixedly coupled with the anchor 225. For example, rotation of the shaft 295 can cause rotation of the anchor 225 and translation of the shaft 295 can cause translation of the anchor 225. The shaft 295 can extend through the engagement element 260 to couple with the anchor 225. For example, an inner wall of the engagement element 260 can define an element aperture 405. The shaft 295 can extend through the element aperture 405 to contact the anchor 225. The shaft 295 can be configured to remain spaced apart from the inner wall of the engagement element 260. For example, the shaft 295 can be configured to not interface with the inner wall of the engagement element 260. For example, the shaft 295 can, at least partially, translate with respect to the engagement element 260 without touching the engagement element 260.

The shaft 295 can extend from the anchor 225, through the engagement element 260, and through the driver 265. For example, the shaft 295 can extend from the anchor 225 and through the engagement element 260 via the element aperture 405. The shaft 295 can extend through the cavity 220 of the housing body 210 until the shaft 295 reaches the driver 265. The shaft 295 can extend through the driver 265, including the central structure 310, via the driver aperture 315. The shaft 295 can extend beyond the housing base 215.

Figure 5:
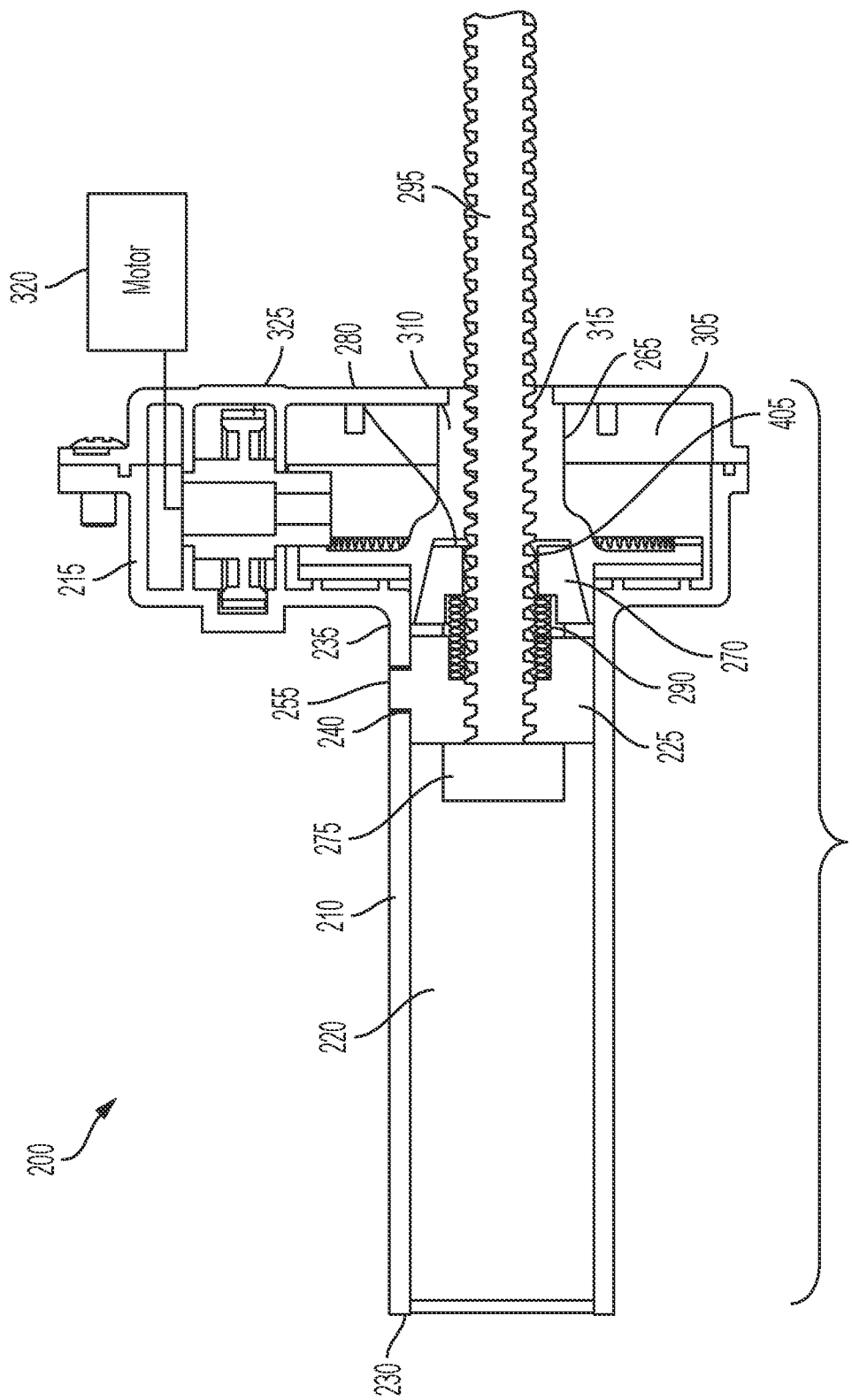
FIG. 5 depicts a side cross-sectional view of an example actuator, in accordance with some aspects.

FIG. 5 depicts a cross-sectional side view of the example actuator 200. The anchor 225 can be disposed at a second end 235 of the housing body 210. The pin 255 of the anchor 225 can be disposed in the rotational portion 250 of the slot 240 of the housing body 210. This position of the anchor 225 can be a second position of the anchor 225. The shaft 295 can move the anchor 225 between the first position and the second position.

To move the anchor 225 from the first position to the second position, the shaft 295 can translate the anchor 225 along the housing body 210 and rotate the anchor 225 within the housing body 210. The translation and rotation of the anchor 225 can occur at different times. For example, the motor 320 can translate the anchor 225 at a first time by translation of the shaft 295 through the driver 265. The motor 320 can rotate the anchor 225 at a second time by rotation of the shaft 295 with the driver 265. The second time can be different than the first time. For example, no rotation occurs when the anchor 225 is translating, and no translation occurs when the anchor 225 is rotation. The motor 320 can cause a rotation of the anchor 225 subsequent to a translation of the anchor 225. The second time can also overlap, at least partially, with the first time. For example, the anchor 225 can begin with translation. The anchor 225 can later begin to rotate as the anchor continues to translate. The anchor 225 can end rotating without any translation. This can also be performed in reverse or with any combination of iterations. The second time can also be the same as the first time, wherein the rotation and translation occur simultaneously.

The motor 320 can cause the driver 265 to rotate in a first direction. When the anchor 225 is disposed at the first position with the pin 255 in the translational portion 245 of the slot 240, rotation of the driver 265 in the first direction can cause translation of the shaft 295 in a first translational direction. For example, the pin 255 can prevent rotation of the anchor 225 which can prevent rotation of the shaft 295, and since the shaft 295 can engage with the driver 265, instead of rotating with the driver 265, the shaft can translate through the driver 265. The first translational direction can move the anchor 225 closer to the second end 235 of the housing body 210.

Translation of the anchor 225 can cause translation of the engagement element 260 along the housing body 210 via the spring 290. When the anchor 225 is close to the second end of the housing body 210, the head 270 of the engagement element 260 can interface with the recess 280 of the driver 265. The driver 265 can prevent the engagement element 260 from translating any further, or at least reduce the rate at which the engagement element 260 translates. The shaft 295 can cause the anchor 225 to translate closer to the head 270 of the engagement element 260. For example, the shaft 295 can cause the anchor 225 to compress the spring 290 disposed between the anchor 225 and the engagement element 260 against the engagement element 260 when the engagement element 260 interfaces with the driver 265. The compression of the spring 290 can increase a friction between the engagement element 260 and the driver 265. The anchor 225 can compress the spring 290 until the pin 255 is aligned with the rotational portion 250 of the slot 240.

The head 270 of the engagement element 260 can have any shape. The recess 280 of the driver 265 can have any shape that corresponds with the shape of the head 270. For example, the head 270 can have a conical shape. The recess 280 can have an inverse conical shape to correspond with the conical shape of the head 270. The recess 280 can receive at least a portion of the head 270 prior to the engagement element 260 engaging with the driver 265. For example, the driver 265 can rotate when the head 270 is disposed in the recess 280 without causing the engagement element 260 to rotate. For example, the friction between the driver 265 and the engagement element 260 is not enough to cause the engagement element 260 to rotate with the driver 265. As the shaft 295 translates through the driver 265 and moves the anchor 225 closer to the driver 265, the spring 290 between the anchor 225 and the engagement element 260 can compress. The compression of the spring 290 can cause the friction between the engagement element 260 and the driver 265 to increase. When the friction reaches a certain threshold, the driver 265 can cause the engagement element 260 to rotate with it. This can provide a smooth engagement between the engagement element 260 and the driver 265.

The head 270 of the engagement element 260 can have other shapes. For example, the head 270 can have a plurality of protrusions that correspond to a plurality of recesses 280 of the driver 265, as shown in FIG. 3 among others. The plurality of recesses 280 can be configured to receive the plurality of protrusions. The same mechanisms described above with reference to the conical-shaped head 270 can apply to the head 270 with the plurality of protrusions. For example, each of the plurality of protrusion may correspond with one of the plurality of recesses 280 of the driver 265. When the protrusions align with the recesses 280 and there is enough friction between the head 270 and the driver 265, the engagement element 260 can begin to rotate with the driver 265. The anchor 225 can compress the spring 290 to create the friction to initiate the engagement between the engagement element and the driver 265.

When the friction between the engagement element 260 and the driver 265 reaches a threshold and the pin 255 is aligned with the rotational portion 250 of the slot 240, the driver 265 can cause the engagement element 260 to rotate. For example, with the pin 255 aligned with the rotational portion 250, the pin 255 cannot counteract the rotational force of the driver 265 applied to the shaft 295 until the pin 255 reaches an end of the rotational portion 250. Rotation of the engagement element 260 can cause rotation of the anchor 225. Rotation of the anchor 225 can cause movement of the pin 255 through the rotational portion 250 of the slot 240. The anchor 225 can rotate until the pin 255 reaches the end of the rotational portion 250.

To move the anchor 225 from the second position to the first position, the motor 320, driver 265, shaft 295, engagement element 260, and the anchor 225 can perform the same or similar functions, but in reverse. For example, the motor 320 can cause the driver 265 to rotate in a second direction (e.g., opposite the first direction). When the anchor 225 is disposed at the second position with the pin 255 in the rotational portion 250 of the slot 240, rotation of the driver 265 in the second direction can cause rotation of the shaft 295 in a second rotational direction. For example, the pin 255 cannot prevent rotation of the anchor 225 in the second rotational direction when the anchor 225 is in the second position, which allows the shaft 295 to rotate in the second rotational direction with the driver 265 until the pin 255 is aligned with the translational portion 245 of the slot 240.

With the pin 255 aligned with the translational portion 245 of the slot 240, the pin 255 can stop the rotation of the anchor 225 in the second rotational direction, which can stop rotation of the shaft 295 in the second rotational direction. The driver 265 can continue to rotate in the second direction, which can cause the shaft 295 to translate in a second translational direction. The second translational direction can move the anchor 225 away from the second end 235 of the housing body 210 and toward the first end 230. As the anchor 225 moves away from the second end 235, the spring 290 can decompress or expand. When expanded, the spring 290 can pull the engagement element 260 with the anchor 225 away from the second end 235 of the housing body 210 and away from the driver 265. For example, translation of the anchor 225 in the second translational direction can pull the head 270 of the engagement element 260 out of the recess 280 of the driver 265, and translate the engagement element 260 along the cavity 220 of the housing body 210.

Actuator 200 can be coupled with a vehicle component of a vehicle. For example, actuator 200 can be coupled with a vehicle component of electric vehicle 105. The vehicle component can be any component configured to move from a first position to a second position. For example, the vehicle component can be a charge port door, a retractable running board, a deployable camp awning, among others. The actuator 200 can move the vehicle component from a first position to a second position. For example, a motor 320 of the actuator 200 can translate and rotate the anchor 225 of the actuator 200. The translation and rotation can occur at different times. The rotation of the anchor 225 can cause a rotation of the vehicle component. The translation of the anchor 225 can cause a translation of the vehicle component. The electric vehicle 105 can include at least one battery cell 120. The battery cell 120 can be electrically coupled with the motor 320. For example, the battery cell 120 can provide power to the motor 320 to move the vehicle component. The battery call 120 can be or include a cylindrical, prismatic, or pouch cell, for example.

Figure 6:
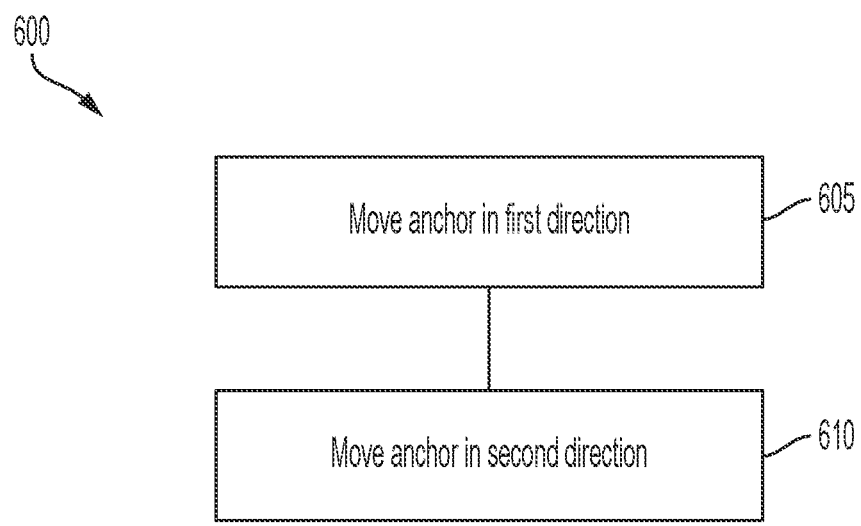
FIG. 6 depicts a flow diagram illustrating an example method to move an anchor, in accordance with some aspects.

FIG. 6 depicts an example method 600 to move an anchor 225. Method 600 can include moving the anchor 225 in a first direction (Act 605) and moving the anchor 225 in a second direction (Act 610). Moving the anchor 225 in a first direction and a second direction can include moving the anchor 225 from a first position to a second position. Moving the anchor 225 in the first direction can occur at a different time than moving the anchor 225 in the second direction. For example, moving in the first direction does not occur simultaneously with moving in the second direction. Act 605 of moving the anchor 225 in a first direction can include receiving power from a motor 320 of an actuator 200. The actuator 200 can be any configuration of the actuator 200 described herein. For example, the actuator 200 can include a driver 265 coupled with the motor 320. A shaft 295 can extend through the driver 265 and into a housing body 210 of the actuator 200. The actuator 200 can include an anchor 225 disposed in a cavity 220 of the housing body 210. The anchor 225 can be coupled with the shaft 295. Act 605 can include using the power from the motor 320 to rotate the driver 265 in a first rotational direction. Rotating the driver 265 in the first rotational direction can cause the anchor 225 to move in the first direction. For example, the first direction can include translating the anchor 225 in a first translational direction. Translating the anchor 225 in the first translational direction can include moving the anchor 225 from a first end 230 of the housing body 210 toward a second end 235 of the housing body 210. Moving the anchor 225 in the first translational direction can include moving the pin 255 along a first portion (translational portion 245) of the slot 240. Rotating the driver 265 can cause a translation of the shaft 295. The shaft 295 can translate through a central structure 310 of the driver 265. For example, a pin 255 of the anchor 225 can be disposed in a translational portion 245 of a slot 240 of the housing body 210. The pin 255 can prevent the shaft 295 from rotating with the driver 265. Instead, the shaft 295 can translate through the driver 265 when the driver 265 rotates. The translation of the shaft 295 can cause the translation of the anchor 225. The translation of the anchor 225 can be based on the power from the motor 320.

Act 605 can also include stopping the translating of the anchor 225. Stopping the translating of the anchor 225 can include moving the pin along the translational portion 245 of the slot 240 until the pin 255 reaches an end of the translational portion 245. The end of the translational portion 245 can be adjacent to a second portion (e.g., the rotational portion 250) of the slot 240. Stopping the translating of the anchor 225 can include aligning the pin 255 of the anchor 225 with a rotational portion 250 of the slot 240 of the housing body 210. Aligning the pin 255 with the rotational portion 250 can include interfacing an engagement element 260 with the driver 265 and compressing a spring 290 disposed between the engagement element 260 and the anchor 225. For example, the engagement element 260 can be disposed in the cavity 220 between the anchor 225 and the driver 265. The engagement element 260 can be coupled with the anchor 225 such that translation of the anchor 225 can cause translation of the engagement element 260. As the anchor 225 translates toward the second end 235 of the housing body 210, the engagement element 260 can move toward the second end 235 of the housing body 210. When close to the second end 235, the engagement element 260 can interface with the driver 265. The anchor 225 can continue to translate along the housing body 210 and compress the spring 290 against the engagement element 260. The anchor 22 can compress the spring 290 until the engagement element 260 engages with the driver 265 and the pin 255 of the anchor 225 is aligned with the rotational portion 250 of the slot 240. The pin 255 can align with the rotational portion 250 of the slot 240 when the pin 255 reaches an end of the translational portion 245 of the slot 240.

Act 610 of moving the anchor 225 in a second direction can include using the power from the motor 320 to move the anchor 225 in the second direction. For example, the rotating of the driver 265 in the first rotational direction can cause the anchor 225 to move in the second direction. The second direction can include rotating the anchor 225 in the first rotational direction. Rotating the anchor 225 in the first rotational direction can include rotating the anchor 225 about a central axis of the driver 265 based on the power from the motor 320. Rotating the driver 265 can cause a rotation of the shaft 295. For example, the pin 255 can be disposed in the rotational portion 250 of the slot 240 of the housing body 210. The pin 255 cannot prevent the shaft 295 from rotating with the driver 265. Therefore, the shaft 295 can rotate with the driver 265 when the driver 265 rotates. The rotation of the shaft 295 can cause the rotation of the anchor 225. Rotation of the anchor 225 can including moving the pin 255 along the rotational portion 250 of the slot 240. The anchor 225 can rotate until the pin 255 reaches an end of the rotational portion 250.

Method 600 can include translating the anchor 225 in the first translational direction prior to rotating the anchor 225 in a first rotational direction. Method 600 can include any number of steps and any order of steps. For example, after the anchor 225 rotates in the first rotational direction, the anchor 225 can rotate in a second rotational direction (e.g., opposite the first rotational direction) and then translate in a second translational direction (e.g., opposite the first translational direction) after rotating the anchor 225 in the second rotational direction. Rotation of the anchor 225 in the second rotational direction and translation of the anchor 225 in the second translational direction can move the anchor 225 from the second position to the first position. To move the anchor 225 in the second rotational direction and then the second translational direction, the same steps described above can be performed, but in reverse.

For example, moving the anchor 225 in the second rotational direction can include rotating the driver 265 in the second rotational direction. Rotation of the driver 265 in the second rotational direction can cause the shaft 295 to rotate in the second rotational direction. For example, the pin 255 of the anchor 225 can be disposed in the rotational portion 250 of the slot 240. When in the rotational portion 250, the pin 255 cannot prevent the rotation of the shaft 295. The pin 255 can stop the rotation of the shaft 295 when the pin 255 reaches an end of the rotational portion 250. At the end of the rotational portion 250, the pin 255 can be aligned with the translational portion 245. The driver 265 can continue to rotate in the second rotational direction which can cause the shaft 295 to translate in a second translational direction through the driver 265 when the pin 255 is aligned with or disposed in the translational portion 245. As the shaft 295 translates through the driver 265, the shaft 295 can move the anchor 225 in the second translational direction (e.g., toward the first end 230 of the housing body 210). As the anchor 225 moves in the second translational direction, the spring 290 between the anchor 225 and the engagement element 260 can decompress or expand. When the spring 290 has expanded, the engagement element 260 can translate with the anchor 225 in the second translational direction.

Figure 7:
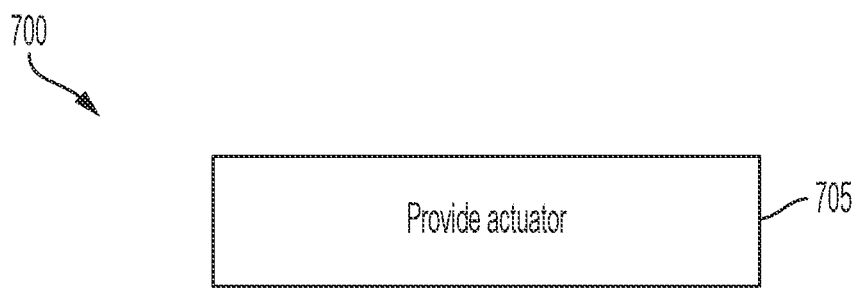
FIG. 7 depicts a flow diagram illustrating an example method to provide an anchor, in accordance with some aspects.

FIG. 7 depicts an example method 700 to provide an actuator 200. Method 700 can include providing an actuator 200 (Act 705). Act 705 can include providing an actuator 200 that includes a driver 265 coupled with a motor 320, a shaft 295 extending through the driver 265, and an anchor 225 coupled with the shaft 295. The motor 320 can translate the anchor 225 at a first time by translation of the shaft 295 through the driver 265. The motor 320 can rotate the anchor 225 at a second time by rotation of the shaft 295 with the driver 265. The second time can be subsequent to the first time. The second time can also be prior to the first time.

The actuator 200 can include any combination of the features described above. For example, the actuator 200 can include a housing 205. The housing 205 can include a housing body 210 and a housing base 215. The housing body 210 can extend away from the housing base 215. The housing body 210 can define a cavity 220. The cavity 220 can retain an anchor 225 and an engagement element 260. The anchor 225 and the engagement element 260 can translate along the housing body 210 and rotate within the housing body 210. For example, the housing body 210 can define a slot 240. The slot 240 can have a first portion (e.g., translational portion 245) and a second portion (e.g., rotational portion 250). The anchor 225 can have a pin 255 configured to move through the slot 240. The anchor 225 and the engagement element 260 can translate along the housing body 210 when the pin 255 is disposed in the translational portion 245 of the slot 240. The anchor 225 and the engagement element 260 can rotate within the housing body 210 when the pin 255 is disposed in the rotational portion 250 of the slot 240.

For example, a shaft 295 can be disposed, at least partially, in the cavity 220, and extend through the driver 265. The shaft 295 can engage with the driver 265. For example, rotation of the driver 265 can apply a rotational force on the shaft 295. The rotational force can cause the shaft 295 to either rotate with the driver 265 or translate through the driver 265. For example, the shaft 295 can be coupled with the anchor 225. The shaft 295 can be fixedly coupled with the anchor 225 such that when the when the shaft 295 rotates or translates, the anchor 225 also rotates or translates, respectively. When the pin 255 of the anchor 225 is disposed in the translational portion 245 of the slot 240, the pin 255 can resist the rotational force the driver 265 applies to the shaft 295 such that the shaft 295 instead can translate through the driver 265. When the pin 255 is disposed in the rotational portion 250 of the slot 240, the pin 255 cannot resist the rotational force of the driver 265 until the pin 255 reaches an end of the rotational portion 250.

The engagement element 260 can translate with the anchor 225 until a force is applied to the engagement element 260. For example, the engagement element 260 can interface with the driver 265. The driver 265 can stop or reduce the translational movement of the engagement element 260. The shaft 295 can cause the anchor 225 to continue to translate toward the driver 265 and compress a spring 290 disposed between the anchor 225 and the engagement element 260. Compression of the spring 290 can allow the anchor 225 to move closer to the engagement element 260. Compression of the spring 290 can increase a frictional force between the engagement element 260 and the driver 265. When the frictional force reaches a threshold, the engagement element 260 can engage with the driver 265. The anchor 225 can continue to compress the spring 290 until the pin 255 of the anchor 225 is aligned with the rotational portion 250 of the slot 240.

When the engagement element 260 is engaged with the driver 265 and the pin 255 is aligned with the rotational portion 250 of the slot 240, the anchor 225 and the engagement element 260 can rotate with the driver 265. For example, a projection 275 of the engagement element 260 can rotatably couple the engagement element 260 with the anchor 225 such that when the driver 265 causes the engagement element 260 to rotate, the engagement element 260 can cause the anchor 225 to rotate. The engagement element 260 and the anchor 225 can rotate within the housing body 210 until the pin 255 reaches an end of the rotational portion 250.

Some of the description herein emphasizes the structural independence of the aspects of the system components or groupings of operations and responsibilities of these system components. Other groupings that execute similar overall operations are within the scope of the present application. The systems described above can provide multiple of any or each of those components and these components can be provided on either a standalone system or on multiple instantiations in a distributed system.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, references to the electric vehicle 105 can include internal combustion engine vehicles that can include the apparatus as described herein. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
   a housing body defining a cavity and a slot, the slot having a translational portion and a rotational portion, the translational portion extending longitudinally along the housing body and the rotational portion extending circumferentially around the housing body;
   a driver coupled with a motor, the driver defining a driver aperture;
   a shaft extending through the driver aperture, a first end of the shaft on a first side of the driver in the housing body and a second end of the shaft on a second side of the driver; and
   an anchor coupled with the first end of the shaft, the anchor comprising a pin, the anchor disposed in the cavity of the housing body and the pin to extend into the slot, the pin configured to move through the slot;
   the motor configured to translate the anchor at a first time by translation of the shaft through the driver aperture with the pin disposed in the translational portion of the slot; and
   the motor configured to rotate the anchor at a second time by rotation of the shaft with the driver with the pin disposed in the rotational portion of the slot, the second time different than the first time.

2. The apparatus of claim 1, comprising:
   an engagement element coupled with the anchor;
   the driver configured to interface with the engagement element; and
   a spring disposed between the anchor and the engagement element, a compression of the spring configured to increase a frictional force between the engagement element and the driver.

3. The apparatus of claim 1, comprising:
   the anchor defining an anchor cavity;
   the driver comprising a recess; and
   an engagement element disposed, at least partially, between the driver and the anchor, the engagement element comprising:
      a head configured to interface with the recess of the driver; and a projection extending from the head toward the anchor, the projection corresponding with the anchor cavity, the projection configured to rotatably couple the engagement element with the anchor.

4. The apparatus of claim 1, comprising:
the anchor defining an anchor cavity;
an engagement element disposed, at least partially, between the driver and the anchor, the engagement element comprising:
  a head comprising a conical shape; and
  a projection extending from the head an into the anchor cavity;
the driver defining a recess configured to receive at least a portion of the head of the engagement element, the recess having an inverse conical shape corresponding with the conical shape of the head.

5. The apparatus of claim 1, comprising:
an engagement element disposed, at least partially, between the driver and the anchor, the engagement element comprising:
  a head comprising a plurality of protrusions; and
  a plurality of projections extending from the head toward the anchor;
the driver defining a plurality of recesses configured to receive the plurality of protrusions.

6. The apparatus of claim 1, comprising:
an engagement element rotatably coupled with the anchor, the engagement element comprising an inner wall defining an element aperture;
the driver comprising a central structure, an inner surface of the central structure defining a driver aperture, the inner surface of the central structure comprising inner threads; and
the shaft comprising outer threads;
the shaft configured to extend from the anchor, through the element aperture, and through the driver aperture;
the inner wall configured to remain spaced apart from the shaft; and
the inner threads of the central structure configured to engage with the outer threads of the shaft.

7. The apparatus of claim 1, comprising:
an engagement element disposed within the cavity;
a spring extending between the anchor and the engagement element; and
the shaft configured to translate the anchor along the housing body and the anchor configured to translate the engagement element via the spring;
the anchor configured to compress the spring against the engagement element when the engagement element interfaces with the driver, the compression of the spring to increase friction between the engagement element and the driver.

8. The apparatus of claim 1, comprising:
a housing base, the motor and the driver disposed, at least partially, within the housing base;
the housing body extending from the housing base; and
a first portion of the shaft disposed in the housing body and a second portion of the shaft disposed in the housing base.

9. The apparatus of claim 1, comprising:
a housing base; and
a gear cluster disposed in the housing base, the gear cluster configured to couple the motor with the driver.

10. The apparatus of claim 1, comprising:
a housing base configured to retain the motor and at least a portion of the driver;

an engagement element configured to engage with the driver;
the housing body extending from the housing base, the housing body configured to retain the anchor and the engagement element.

11. The apparatus of claim 1, comprising:
the motor configured to cause a rotation of the anchor subsequent to a translation of the anchor.

12. The apparatus of claim 1, comprising:
the housing body having a length less than 80 mm.

13. A method, comprising:
moving an anchor of an actuator in a first direction at a first time, the actuator comprising:
  a housing body defining a cavity and a slot, the slot having a translational portion and a rotational portion, the translational portion extending longitudinally along the housing body and the rotational portion extending circumferentially around the housing body;
  a driver coupled with a motor, the driver defining a driver aperture;
  a shaft extending through the driver aperture, a first end of the shaft on a first side of the driver in the housing body and a second end of the shaft on a second side of the driver; and
  the anchor coupled with the first end of the shaft, the anchor comprising a pin, the anchor disposed in the cavity of the housing body and the pin to extend into the slot, the pin configured to move through the slot; and
moving the anchor in a second direction at a second time, wherein the second time is different from the first time;
the first time comprising the pin disposed in the translational portion of the slot and the second time comprising the pin disposed in the rotational portion of the slot.

14. The method of claim 13, comprising:
receiving power from the motor;
moving the anchor in the first direction based on the power from the motor, the first direction comprising translating the anchor along the housing body of the actuator; and
moving the anchor in the second direction based on the power from the motor, the second direction comprising rotating the anchor around a central axis of the driver.

15. The method of claim 13, comprising:
moving the anchor in the first direction, the first direction comprising a first translational direction; and
moving the anchor in the second direction subsequent to moving the anchor in the first direction, the second direction comprising a first rotational direction;
moving the anchor in a third direction subsequent to moving the anchor in the second direction, the third direction comprising a second rotational direction, the second rotational direction opposite the first rotational direction; and
moving the anchor in a fourth direction subsequent to moving the anchor in the third direction, the fourth direction comprising a second translational direction, the second translational direction opposite the first translational direction.

16. The method of claim 13, wherein the actuator comprises an engagement element and a spring disposed between the anchor and the engagement element, the method comprising:
interfacing the engagement element with the driver;
compressing the spring between the engagement element and the anchor; and
engaging the engagement element with the driver.

17. The method of claim 13, comprising:
moving the pin along the translational portion of the slot until the pin reaches an end of the translational portion, the end of the translational portion being adjacent to the rotational portion of the slot; and
moving the pin along the rotational portion of the slot.

18. An electric vehicle, comprising:
an actuator coupled with a vehicle component; the actuator comprising:
- a housing body defining a cavity and a slot, the slot having a translational portion and a rotational portion, the translational portion extending longitudinally along the housing body and the rotational portion extending circumferentially around the housing body;
- a motor;
- a driver coupled with the motor, the driver defining a driver aperture;
- a shaft extending through the driver aperture, a first end of the shaft on a first side of the driver in the housing body and a second end of the shaft on a second side of the driver; and
- an anchor coupled with the first end of the shaft, the anchor comprising a pin, the anchor disposed in the cavity of the housing body and the pin to extend into the slot, the pin configured to move through the slot;

the motor configured to translate the anchor at a first time with the pin disposed in the translational portion of the slot and rotate the anchor at a second time different from the first time with the pin disposed in the rotational portion of the slot; and the actuator configured to move the vehicle component from a first position to a second position.

* * * * *